J. K. TOLES.
AERIAL NAVIGATION.
APPLICATION FILED DEC. 8, 1908.
988,523.
Patented Apr. 4, 1911.
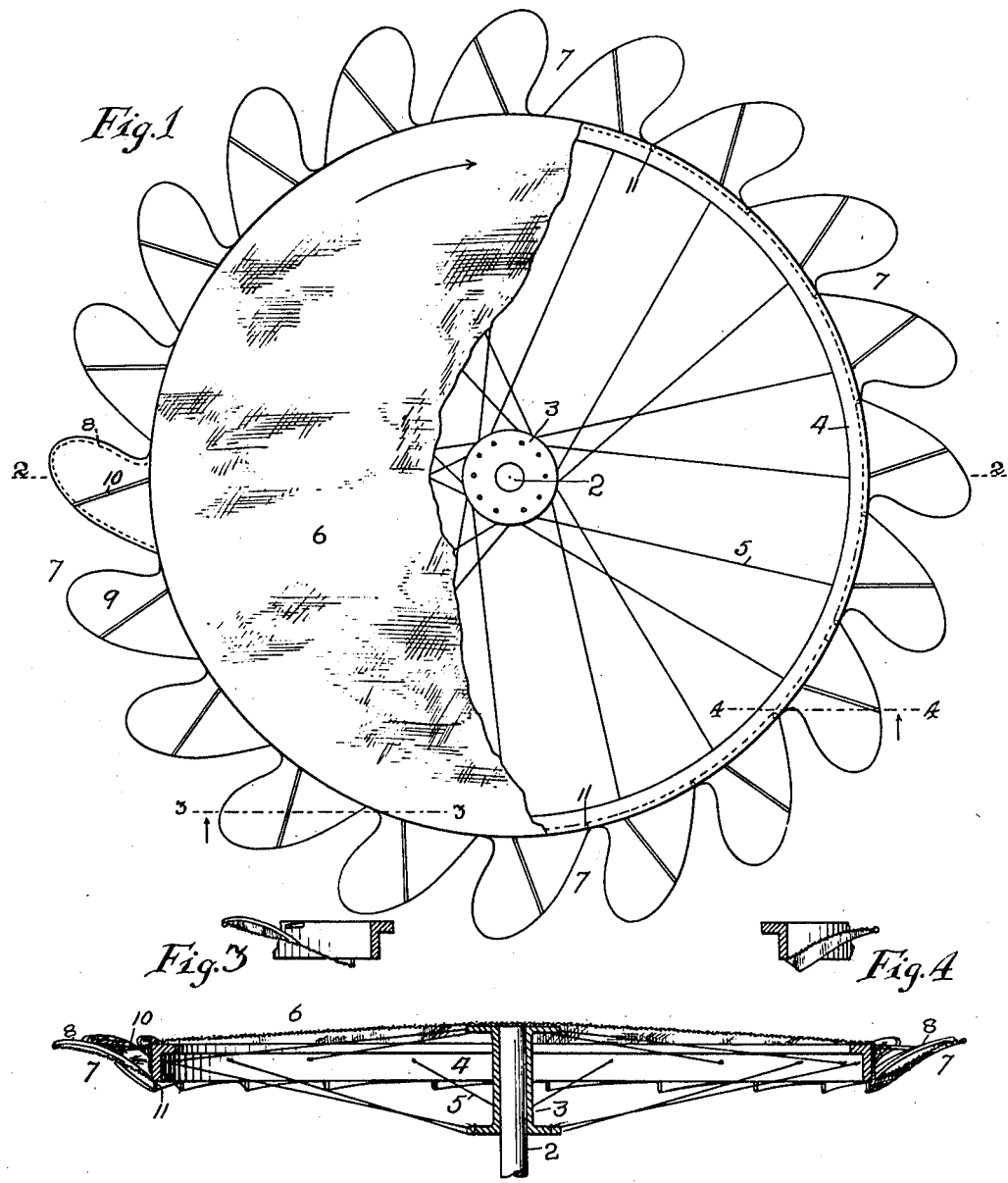
Witnesses
Inventor
Justin Kay Toles
By
Attorney

UNITED STATES PATENT OFFICE.

JUSTIN KAY TOLES, OF STOCKTON, CALIFORNIA.

AERIAL NAVIGATION.

988,523. Specification of Letters Patent. Patented Apr. 4, 1911.

Application filed December 8, 1908. Serial No. 466,563.

*To all whom it may concern:*

Be it known that I, JUSTIN KAY TOLES, a citizen of the United States of America, residing at Stockton, county of Stockton, State of California, have invented certain new and useful Improvements in Aerial Navigation; and I do hereby declare the following to be a full, clear, and exact description of the invention, such as will enable others skilled in the art to which it appertains to make and use the same.

This invention relates to improvements in aerial navigation, and more particularly to raising and sustaining means for flying machines.

It consists substantially of a construction providing an aerogyroplane, which latter preferably has a plurality of blades rotatively associated therewith at the perimeter thereof.

An object of the invention is to provide a device of this class having a large lifting and sustaining capacity, also one that will lift vertically and have considerable sustaining capacity in the event of the rotating means ceasing to act.

A further object is to produce a gyroscopic effect, so that the apparatus shall not be liable to overturn through air currents and eddies.

It is also an object to provide a device of this description that will be light and strong in structure.

Further objects and advantages of the invention will be apparent upon consideration of the following specification, reference being had to the accompanying drawing, in which—

Figure 1 is a plan view, portions of the apparatus being broken away; Fig. 2 is a central vertical section; Figs. 3 and 4 are sections on lines 3—3 and 4—4 respectively of Fig. 1.

The central shaft 2 may be that to which the propellers usually are attached in that class of flying machines designated as helicopters, and may be adapted to be driven by any suitable motor (not shown) in the direction indicated by the arrow. To shaft 2 a hub 3 may be affixed and connected to rim 4 by spokes 5. A disk 6 of silk or other suitable material is secured at its periphery to the upper edge of rim 4. On rim 4 are secured a number of blades 7, each extending outwardly from the periphery of the rim and having its advancing edge somewhat higher than the rear edge. Each of these blades may be formed of a frame 8, to which is secured a sheet of silk 9. Braces 10 and 11 may be provided to aid in holding the blades in position.

It is to be noted that the rim 4 being substantially rigid, lessens the tendency to deformation of the disk 6 in use; and it also serves as a means to which the blades 7 can be attached and the spokes and braces secured.

While the rim 4 is preferably made to have a portion thereof depending, as shown, it will be evident that this feature may be dispensed with and the blades may then be attached to the rim at or near to the edge of the disk 6.

From the foregoing it will be understood by those skilled in the art that the structure comprising the rim 4 carrying the disk 6 and mechanically connected to the shaft 2, constitutes an aerogyroplane; which is adapted to be used in practice with blades 7 arranged around the periphery thereof, or not, as may be desired.

The mode of operation of this device is as follows: Motion being communicated to shaft 2, the device as a whole rotates. Blades 7 draw the air from above the upper surface of disk 6 and throw it downwardly beneath said disk, thus raising and sustaining the device and the apparatus to which it is attached. The gyroscopic effect produced by the rotation of the disk gives airships to which disks are attached great inherent stability.

One form of structure embodying the invention has been described, and illustrated, but it is obvious that other forms and modifications may be made, and the right is reserved to all such as come within the spirit and scope of the invention.

I claim:

1. In raising and sustaining means for aerial navigation, the combination of a rotating disk of silk or other suitable material and a rim therefor, with a plurality of blades rigidly attached at the periphery of the rim and extending outwardly therefrom.

2. In a raising and sustaining device for aerial navigation, a horizontally rotating disk, a downwardly depending rim thereon, and a plurality of blades attached to said rim.

3. In raising and sustaining means for aerial navigation, the combination with an aerogyroplane comprising a rim and a disk secured thereto, of means for rotating the same, and a plurality of blades arranged on the periphery of said aerogyroplane.

4. In sustaining means for aerial navigation an aerogyroplane comprising a substantially rigid rim, a disk of silk or other suitable material secured to said rim, a shaft, and means for connecting said rim to said shaft.

5. The combination of an aerogyroplane comprising a substantially rigid rim, a disk secured to said rim, a shaft, and means for connecting said rim to said shaft, with blades arranged on the periphery of the aerogyroplane, substantially as described.

6. The combination of an aerogyroplane comprising a substantially rigid rim, a disk secured to said rim, a shaft, and means connecting said rim to said shaft, with blades arranged on the periphery of the aerogyroplane and extending outwardly therefrom, the advancing edges thereof being somewhat higher than the rear edges thereof, substantially as described.

In testimony whereof, I have signed my name to this specification in the presence of two subscribing witnesses at Los Angeles county of Los Angeles, State of California, this 1st day of December A. D. 1908.

JUSTIN KAY TOLES.

Witnesses:
H. R. HENZE,
ALEX. H. LIDDERS.